United States Patent [19]

Sezume et al.

[11] Patent Number: 5,059,658

[45] Date of Patent: Oct. 22, 1991

[54] METHOD OF PRODUCING MODIFIED POLYPROPYLENE

[75] Inventors: Tadashi Sezume, Ohi; Akira Kobayashi, Kamifukuoka; Masahide Murata, Ohi; Mayako Ogata, Kamifukuoka; Masahiro Ohsawa, Yokohama; Takashi Mikami, Komae, all of Japan

[73] Assignee: Tonen Sekiyagaku Kabushiki Kaisha, Tokyo, Japan

[21] Appl. No.: 503,583

[22] Filed: Apr. 3, 1990

[30] Foreign Application Priority Data

Apr. 7, 1989 [JP] Japan ................................. 1-89221
Apr. 7, 1989 [JP] Japan ................................. 1-89222

[51] Int. Cl.$^5$ ................... C08F 279/00; C08F 255/02
[52] U.S. Cl. ................................. 525/263; 525/276; 525/288; 525/286; 525/285; 525/301; 525/293; 525/310; 525/312; 525/315
[58] Field of Search ............... 525/315, 263, 285, 301, 525/286, 293

[56] References Cited

U.S. PATENT DOCUMENTS

| | | | |
|---|---|---|---|
| 4,602,077 | 7/1986 | Cecchin et al. | 525/315 |
| 4,786,689 | 11/1988 | Lund et al. | 525/315 |
| 4,845,155 | 7/1989 | Dean | 525/315 |
| 4,876,727 | 4/1975 | Meredith et al. | 525/315 |

FOREIGN PATENT DOCUMENTS

| | | |
|---|---|---|
| 137519 | 4/1985 | European Pat. Off. |
| 59-155416 | 9/1984 | Japan |
| 60-032834 | 2/1985 | Japan |
| 62-115007 | 5/1987 | Japan |

*Primary Examiner*—Carman J. Seccuro
*Attorney, Agent, or Firm*—Armstrong, Nikaido, Marmelstein, Kubvcik & Murray

[57] ABSTRACT

A method of producing a modified polypropylene comprising the step of graft-polymerizing a propylene random copolymer containing an unconjugated diene comonomer represented by the general formula:

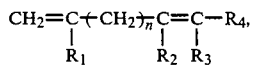

wherein $R_1$–$R_4$ are H or an alkyl group having 1-6 carbon atoms, and n is an integer of 1-20, with a monomer having an unsaturated bond by a radical method.

11 Claims, No Drawings

METHOD OF PRODUCING MODIFIED POLYPROPYLENE

BACKGROUND OF THE INVENTION

The present invention relates to a method of producing a modified polypropylene by graft polymerization at a high graft ratio without suffering from a decrease in molecular weight.

Since polypropylene is inexpensive and excellent in moldability, insulation, chemical resistance, mechanical strength, etc., it is widely used in various applications such as films, fibers, moldings, etc.

However, polypropylene is poor in chemical properties such as adhesion, coatability, printability, hydrophilic properties, etc. due to its structure. To solve these problems, an investigation has been being conducted on the graft polymerization of polypropylene with various unsaturated compound monomers.

The graft polymerization of polypropylene with unsaturated compound monomers is usually conducted by treating polypropylene with irradiation of electron beams, ultraviolet rays, etc. or with ozone to generate radicals and then reacting the treated polypropylene with unsaturated compound monomers, or by reacting polypropylene with unsaturated compound monomers in the presence of radical generators such as organic peroxides.

However, in such conventional methods, the scission of polypropylene chains takes place in the process of radical generation, resulting in a low molecular weight and a low graft ratio. Accordingly, the resulting modified polypropylenes suffer from unpleasant odors and coloring due to unreacted monomers, failing to have desired properties. Further, since the resulting modified polypropylenes have too small of a molecular weight, moldings containing them are poor in strength.

OBJECTS AND SUMMARY OF THE INVENTION

Accordingly, an object of the present invention is to provide a method of producing a graft copolymer-modified polypropylene at a high graft ratio without suffering from a decrease in molecular weight.

As a result of intense research in view of the above object, the inventors have found that the graft polymerization of a copolymer containing propylene and a particular unconjugated diene comonomer with a monomer having an unsaturated bond by a radical reaction can drastically increase the graft reaction rate of the copolymer. The present invention is based on this finding.

Thus, the method of producing a modified polypropylene according to one embodiment of the present invention comprises the step of graft-polymerizing a propylene random copolymer containing an unconjugated diene comonomer represented by the general formula:

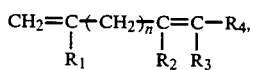

wherein $R_1$–$R_4$ are H or an alkyl group having 1–6 carbon atoms, and n is an integer of 1–20, with a monomer having an unsaturated bond by a radical method.

The preferred relations between a weight-average molecular weight and a graft ratio (by weight %) in the resulting graft copolymer is expressed by the following equation:

$$50000 \leq (\text{molecular weight}) \times (\text{graft ratio}).$$

The method of producing a modified polypropylene according to another embodiment of the present invention comprises the step of graft-polymerizing a propylene random copolymer containing an unconjugated diene comonomer represented by the general formula:

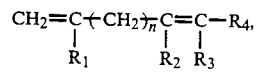

wherein $R_1$–$R_4$ are H or alkyl group having 1–6 carbon atoms, and n is an integer of 1–20, excluding a case where $R_3$ or $R_4$ is a methyl group and all other substituents are H when n=1, with a monomer having an electron-attracting group and an unsaturated bond, in the absence of a radical generator.

DETAILED DESCRIPTION OF THE INVENTION

In the present invention, propylene is copolymerized with an unconjugated diene comonomer represented by the general formula:

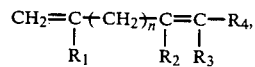

wherein $R_1$–$R_4$ are H or an alkyl group having 1–6 carbon atoms, and n is an integer of 1–20.

The unconjugated diene comonomers which may be used include 2-methyl-1,4-pentadiene, 1,4-hexadiene, 4-methylidene-1-hexene, 4-methyl-1,4-hexadiene, 5-methyl-1,4-hexadiene, 1,4-heptadiene, 4-ethyl-1,4-hexadiene, 4,5-dimethyl-1,4-hexadiene, 4-methyl-1,4-heptadiene, 4-ethyl-1,4-heptadiene, 5-methyl-1,4-heptadiene, 5-methyl-1,4-octadiene, 1,5-heptadiene, 1,5-octadiene, 5-methyl-1,5-heptadiene, 6-methyl-1,5-heptadiene, 2-methyl-1,5-hexadiene, 1,6-octadiene, 6-methyl-1,6-octadiene, 7-methyl-1,6-octadiene, 2-methyl-1,6-heptadiene, 1,9-decadiene, 1,13-tetradecadiene, etc. Among them, 1,4-hexadiene, 2-methyl-1,5-hexadiene, 7-methyl-1,6-octadiene, 1,9-decadiene, 1,13-tetradecadiene, etc. are particularly preferable. These unconjugated diene comonomers may be used in combination.

When the subsequent graft polymerization is conducted in the absence of a radical generator, the unconjugated diene comonomer has the general formula:

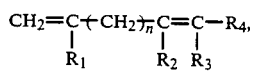

wherein $R_1$–$R_4$ are H or an alkyl group having 1–6 carbon atoms, and n is an integer of 1–20, excluding a case where $R_3$ or $R_4$ is a methyl group and all other substituents are H when n=1.

Since in the case where $R_3$ or $R_4$ is a methyl group and all other substituents are H is excluded when n=1 in the above formula, 1,4-hexadiene is excluded, because it shows a slow graft polymerization velocity in the graft polymerization in the absence of a radical generator.

The random copolymerization of propylene with the unconjugated diene comonomer can be conducted by a usual copolymerization method using a Ziegler-Natta catalyst. In this case, the proportion of the unconjugated diene comonomer is preferably 0.05-10 mol %. When the unconjugated diene comonomer content is lower than 0.05 mol %, a high graft ratio cannot be obtained in the subsequent graft reaction. And when it exceeds 10 mol %, the crystallinity of the resulting copolymer decreases drastically. The more preferred unconjugated diene comonomer content is 0.1-3.0 mol %.

The random copolymer may contain 5 mol % or less of other unsaturated compound monomers such as ethylene, butene-1, etc. The copolymer desirably has a molecular weight of 100,000-1,000,000.

Monomers graft-polymerized with the random copolymer should have an unsaturated bond. Examples of the unsaturated bonds include a vinyl bond and an acetylene bond. Such monomers are specifically acrylamide, N,N-dimethylacrylamide, methacylamide, N,N-diethylmethacrylamide, 2-vinyl pyridine, glycidyl acrylate, glycidyl methacrylate, vinyl isocyanate, vinyl diphenylamine, N-vinyl phthalimide, acrylonitrile, methyl vinyl sulfide, vinyl sulfonic acid, acrylic acid, maleic anhydride, vinyl triethylsilane, allyltriethoxysilane, methyl vinyl ketone, acrolein, ethyl vinyl ether, vinyl formate, vinyl acetate, vinyl trifluoroacetate, vinyl benzoate, vinyl stearate, vinyl chloride, vinylidene chloride, styrene, α-methylstyrene, etc. Among them, maleic anhydride, acrylic acid, glycidyl methacrylate, etc. are preferable when the graft polymerization is conducted by a radical method. On the other hand, when it is conducted in the absence of a radical generator, maleic anhydride, acrylonitrile, glycidyl methacrylate, etc. are preferable.

In the first embodiment, the random copolymer of propylene and the unconjugated diene comonomer may be graft-polymerized by a radical method with the comonomer having an unsaturated bond. The radical method includes a solution method in which the random copolymer is dissolved in an organic solvent such as xylene, toluene, etc., and a comonomer and a radical generator are added thereto to cause a graft reaction; a melt blending method in which the random copolymer, a comonomer and a radical generator are melt-blended for graft reaction in an extruder, etc. Particularly, the melt blending method is preferable because a continuous reaction is easily conducted.

The proportion of the graft comonomer to the random copolymer is determined so that the graft ratio is 0.1-10 weight %. Incidentally, in the case of the melt-blending method, the reaction time is 10 seconds to 20 minutes.

The radical generators (initiators) include peroxides such as benzoyl peroxide, lauroyl peroxide, di-tert-butyl peroxide, acetyl peroxide, tert-butyl peroxibenzoate, dicumyl peroxide, peroxibenzoic acid, peroxiacetic acid, tert-butyl peroxipivalate, azo compounds such as azobisisobutyronitrile, etc. The amount of the radical generator is 0.1-10 parts by weight per 100 parts by weight of the radically-copolymerizable monomer.

The modified polypropylene (graft copolymer) thus obtained has a weight-average molecular weight of 50,000-1,000,000, a graft ratio of 0.1-10 weight % and the product of the weight-average molecular weight and the graft ratio (molecular weight × weight %) of 50000 or more, particularly 100,000 or more. The upper limit of this product is 1,000,000 or so. The reduction of molecular weight from that of unmodified polypropylene by graft polymerization is extremely small. In addition, when compared with a conventionally produced modified polypropylene having the same molecular weight, the modified polypropylene produced by the present invention has a dramatically higher graft ratio.

Specifically, as shown in Examples, when comparison is made on the modified polypropylene produced at a graft ratio of 0.7 weight % from a polypropylene starting material having an weight-average molecular weight of 250,000, the reduction of a molecular weight is as small as 20% in the modified polypropylene produced according to the method of the present invention, while it is 76% in that produced by the conventional method. In addition, when comparison is made on the modified polypropylene having a molecular weight of 60,000, the modified polypropylene produced according to the method of the present invention has a graft ratio of 4.2-6.5 weight %, remarkably higher than 0.7 weight % in those produced by the conventional method.

In the second embodiment, the random copolymer of propylene and the unconjugated diene comonomer may be graft-polymerized with the monomer having an unsaturated bond by a thermal transition reaction of double bonds. In this case, a Lewis acid may be used as a catalyst.

The graft polymerization may be conducted by any methods including a solution method in which the propylene random copolymer is dissolved in an organic solvent such as xylene, toluene, etc. and a graft comonomer is added thereto to cause a graft reaction; a melt blending method in which the propylene random copolymer and a graft comonomer are melt-blended for graft reaction in an extruder, etc. Particularly, the melt blending method is preferable because a continuous reaction is easily conducted.

The proportion of the graft comonomer to the propylene random copolymer is determined so that the graft ratio is 0.05-5 weight %. Incidentally, in the case of the solution method, the reaction temperature is preferably 90°-200° C. and the reaction time is preferably 0.5-100 hours. In the case of the melt blending method, the reaction temperature is preferably 180°-300° C. and the reaction time is preferably 0.2-10 minutes. Particularly when the reaction time is long, the graft polymerization reaction is preferably conducted in an inert gas atmosphere.

The modified polypropylene (graft copolymer) thus obtained has a weight-average molecular weight of 50,000-1,000,000, about 20% lower than that of the unmodified polypropylene. Particularly depending on the reaction conditions, the reduction of molecular weight is as small as 0-10%. Accordingly, it is possible to provide a modified polypropylene having a high molecular weight which cannot be obtained by the conventional methods. Specifically, when comparison is made on the modified polypropylene having molecular weight of 200,000 or so, the modified polypropylene produced according to the method of the present invention has a graft ratio of 0.3 weight % or more, dramatically higher than that achieved by the conventional methods.

In the method of the second embodiment, the graft polymerization reaction is not a radical polymerization but a thermal transition reaction between the above monomer and the double bonds of side chains of the polypropylene copolymer. Thus, since the radical generator is not used, the scission of copolymer chains due to the radical generator does not take place, ensuring the production of modified polypropylenes (graft copolymers) having high molecular weights which are substantially not different from those of the unsaturated copolymers before graft polymerization.

Accordingly, the modified polypropylene produced according to the method of the present invention shows a remarkably smaller reduction of molecular weight and much higher graft ratio by graft polymerization than those produced by the conventional methods.

The present invention will be described in further detail by means of the following Examples without any intention of restricting the scope of the present invention.

EXAMPLES 1-7, COMPARATIVE EXAMPLES 1 AND 2

Propylene was graft-polymerized with various unconjugated diene comonomers shown in Table 1 by using a Ziegler-Natta catalyst by a usual method. The resulting random copolymers had comonomer contents and molecular weights shown in Table 1.

Each of the random copolymers was dry-blended with various comonomers and Perhexine 2-5B (radical generator manufactured by Nippon Oil and Fat Co., Ltd.) shown in Table 1. The resulting mixture was melt-blended in a 45-mm-diameter double screw extruder at 200° C. and 200 rpm to conduct graft reaction. The average reaction time was about 1 minute.

The resulting modified polypropylene (graft copolymer) had molecular weights and graft contents shown in Table 1.

Incidentally, the molecular weight was measured by a GPC method using orthodichlorobenzene as a solvent, and the graft content was measured by an infrared spectrum method.

EXAMPLES 8-10

Modified polypropylene was produced in the same manner as in Example 2 except for changing the content of the unconjugated diene comonomer in the propylene random copolymer and the amount of a radical generator used, and the same properties as in Example 2 were measured. The results are shown in Table 1.

TABLE 1

| No. | Example 1 | 2 | 3 | 4 | 5 | 6 |
|---|---|---|---|---|---|---|
| Copolymer | | | | | | |
| *Comonomer* | | | | | | |
| Type | HD[1] | HD | HD | HD | MOD[2] | MHD[3] |
| Content (mol %) | 0.7 | 0.7 | 0.7 | 0.7 | 0.3 | 0.2 |
| Molecular Weight ($\bar{M}w$) | $25 \times 10^4$ | $25 \times 10^4$ | $25 \times 10^4$ | $25 \times 10^4$ | $22 \times 10^4$ | $25 \times 10^4$ |
| Graft Reaction Conditions | | | | | | |
| Radical Generator (phr)[5] | 0.03 | 0.04 | 0.05 | 0.05 | 0.04 | 0.04 |
| *Graft monomer* | | | | | | |
| Type | MAH[6] | MAH | MAH | GMA[7] | MAH | MAH |
| Content (phr) | 3.0 | 5.0 | 7.0 | 5.0 | 5.0 | 5.0 |
| Graft Copolymer | | | | | | |
| Molecular Weight ($\bar{M}w$) | $10 \times 10^4$ | $8 \times 10^4$ | $6 \times 10^4$ | $6 \times 10^4$ | $8 \times 10^4$ | $9 \times 10^4$ |
| Graft Content (weight %) | 2.9 | 4.8 | 6.5 | 4.2 | 4.5 | 4.6 |

| No. | Example 7 | 8 | 9 | 10 | Comparative Example 1 | 2 |
|---|---|---|---|---|---|---|
| Copolymer | | | | | | |
| *Comonomer* | | | | | | |
| Type | DD[4] | HD[1] | HD | HD | — | Ethylene |
| Content (mol %) | 0.3 | 0.7 | 0.3 | 0.1 | — | 5 |
| Molecular Weight ($\bar{M}w$) | $23 \times 10^4$ | $25 \times 10^4$ | $25 \times 10^4$ | $25 \times 10^4$ | $25 \times 10^4$ | $25 \times 10^4$ |
| Graft Reaction Conditions | | | | | | |
| Radical Generator (phr)[5] | 0.04 | 0.008 | 0.04 | 0.04 | 0.04 | 0.04 |
| *Graft monomer* | | | | | | |
| Type | MAH[6] | MAH | MAH | MAH | MAH | MAH |
| Content (phr) | 5.0 | 5.0 | 5.0 | 5.0 | 5.0 | 5.0 |
| Graft Copolymer | | | | | | |
| Molecular Weight ($\bar{M}w$) | $8 \times 10^4$ | $20 \times 10^4$ | $8 \times 10^4$ | $8 \times 10^4$ | $5 \times 10^4$ | $6 \times 10^4$ |
| Graft Content (weight %) | 4.8 | 0.7 | 2.6 | 1.5 | 0.5 | 0.7 |

Note:
[1] HD: 1,4-Hexadiene.
[2] MOD: 7-Methyl-1,6-octadiene.
[3] MHD: 2-Methyl-1,5-hexadiene.
[4] DD: 1,9-Decadiene.
[5] Parts by weight per 100 parts by weight of resin components.
[6] MAH: Maleic anhydride.
[7] GMA: Glycidyl methacrylate.

As is clear from the above results, in the production of graft copolymers by using the propylene random copolymers containing unconjugated diene comonomers, the reduction of molecular weight can substantially be avoided while increasing the graft ratio.

EXAMPLES 11-20, COMPARATIVE EXAMPLES 3-10

Propylene was graft-polymerized with various unconjugated diene comonomers shown in Table 2 by using a Ziegler-Natta catalyst (propylene-polymerizing catalyst containing titanium trichloride as a main component) at 70° C. The resulting random copolymers had comonomer contents and molecular weights shown in Table 2.

Each of the random copolymers was graft-polymerized with various monomers shown in Table 2. The graft polymerization was conducted by a solution method, a melt blending method using an extruder and a melt blending method using a Banbury mixer as follows:

(1) Solution Method

An unsaturated copolymer was dissolved in xylene at 140° C. to prepare a 10-weight % solution, and 5 weight % of a monomer was added thereto to cause a polymerization reaction for a period of time shown in Table 2 in a nitrogen gas atmosphere. Next, part of the polymerization solution was poured into a large amount of acetone to precipitate the formed graft copolymer, which was then dried in a vacuum drier.

(2) Melt Blending Method Using Extruder

An unsaturated copolymer was dry-blended with 2 phr of a monomer and melt-blended in a 45-mm-diameter double screw extruder at 200 rpm at a temperature shown in Table 2.

(3) Melt Blending Method Using Banbury Mixer

An unsaturated copolymer was blended with 2 phr of a monomer and melt-blended in a Banbury mixer having a volume of 1.7 l at 165 rpm at a temperature and for a period of time both shown in Table 2.

Incidentally, the molecular weight was measured by a GPC method using orthodichlorobenzene as a solvent, and the graft content was measured by an infrared spectrum method.

TABLE 2

| No. | Example | | | | | |
|---|---|---|---|---|---|---|
| | 11 | 12 | 13 | 14 | 15 | 16 |
| Unsaturated Copolymer | | | | | | |
| Comonomer | | | | | | |
| Type | MHD[1] | MHD | MHD | MHD | MHD | MHD |
| Content (mol %) | 0.8 | 0.8 | 0.8 | 0.8 | 0.8 | 0.8 |
| Molecular Weight ($\overline{Mw}$) | $25 \times 10^4$ | $25 \times 10^4$ | $25 \times 10^4$ | $25 \times 10^4$ | $25 \times 10^4$ | $25 \times 10^4$ |
| Graft Reaction Conditions | | | | | | |
| Reaction Method | SM[4] | SM | MBE[5] | MBE | MBE | MBE |
| Monomer Type | MAH[7] | MAH | MAH | MAH | GMA[8] | GMA |
| Temperature (°C.) | 140 | 140 | 250 | 280 | 250 | 280 |
| Time | 5 hours | 10 hours | ≦1 min. | ≦1 min. | ≦1 min. | ≦1 min. |
| Graft Copolymer | | | | | | |
| Molecular Weight ($\overline{Mw}$) | $23 \times 10^4$ | $23 \times 10^4$ | $25 \times 10^4$ | $23 \times 10^4$ | $25 \times 10^4$ | $23 \times 10^4$ |
| Graft Content (weight %) | 0.68 | 1.05 | 0.40 | 0.45 | 0.30 | 0.33 |

| No. | Example | | | | Comparative Example | |
|---|---|---|---|---|---|---|
| | 17 | 18 | 19 | 20 | 3 | 4 |
| Unsaturated Copolymer | | | | | | |
| Comonomer | | | | | | |
| Type | MHD[1] | MOD[2] | MOD | MOD | HD[3] | HD |
| Content (mol %) | 2.0 | 0.8 | 0.8 | 2.0 | 0.7 | 0.7 |
| Molecular Weight ($\overline{Mw}$) | $24 \times 10^4$ | $23 \times 10^4$ | $23 \times 10^4$ | $25 \times 10^4$ | $23 \times 10^4$ | $23 \times 10^4$ |
| Graft Reaction Conditions | | | | | | |
| Reaction Method | MBE[5] | MBE | MBE | MBE | SM[4] | SM |
| Monomer Type | MAH[7] | MAH | MAH | MAH | MAH | MAH |
| Temperature (°C.) | 250 | 250 | 280 | 250 | 140 | 140 |
| Time | ≦1 min. | ≦1 min. | ≦1 min. | ≦1 min. | 5 hours | 10 hours |
| Graft Copolymer | | | | | | |
| Molecular Weight ($\overline{Mw}$) | $24 \times 10^4$ | $23 \times 10^4$ | $21 \times 10^4$ | $25 \times 10^4$ | $22 \times 10^4$ | $21 \times 10^4$ |
| Graft Content (weight %) | 0.50 | 0.42 | 0.79 | 1.15 | 0.01 | 0.02 |

| No. | Comparative Example | | | | | |
|---|---|---|---|---|---|---|
| | 5 | 6 | 7 | 8 | 9 | 10 |
| Unsaturated Copolymer | | | | | | |
| Comonomer | | | | | | |
| Type | HD[3] | HD | HD | HD | HD | NONE |
| Content (mol %) | 0.7 | 0.7 | 2.0 | 0.7 | 0.7 | — |
| Molecular Weight ($\overline{Mw}$) | $23 \times 10^4$ | $23 \times 10^4$ | $25 \times 10^4$ | $23 \times 10^4$ | $23 \times 10^4$ | $25 \times 10^4$ |
| Graft Reaction Conditions | | | | | | |
| Reaction Method | MBE[5] | MBE | MBE | MBB[6] | MBB | MBE |
| Monomer Type | MAH[7] | MAH | MAH | MAH | MAH | MAH |
| Temperature (°C.) | 250 | 280 | 250 | 280 | 280 | 280 |
| Time | ≦1 min. | ≦1 min. | ≦1 min. | 0.1 hours | 0.5 hours | ≦1 min. |
| Graft Copolymer | | | | | | |
| Molecular Weight ($\overline{Mw}$) | $22 \times 10^4$ | $20 \times 10^4$ | $24 \times 10^4$ | $8 \times 10^4$ | $5 \times 10^4$ | $25 \times 10^4$ |
| Graft Content | 0.02 | 0.05 | 0.10 | 0.25 | 0.59 | 0 |

TABLE 2-continued (weight %)

Note:
[1] MHD: 2-methyl-1,5-Hexadiene.
[2] MOD: 7-Methyl-1,6-octadiene.
[3] HD: 1,4-hexadiene.
[4] SM: Solution method.
[5] MBE: Melt blending method using double screw extruder.
[6] MBB: Melt blending method using Banbury mixer.
[7] MAH: Maleic anhydride.
[8] GMA: Glycidyl methacrylate.

COMPARATIVE EXAMPLES 11-14

Propylene was copolymerized with various comonomers shown in Table 3 to prepare copolymers, and each copolymer was dry-blended with maleic anhydride and Perhexine 2-5 B (radical generator manufactured by Nippon Oil and Fat Co., Ltd.) and melt-blended in a 45-mm-diameter double screw extruder at 210° C. and 200 rpm to conduct graft reaction. The amounts of Perhexine 2-5 B and maleic anhydride are as shown in Table 3, and an average reaction time was about 1 minute or less.

The resulting modified polypropylene (graft copolymer) had molecular weights and graft contents shown in Table 3.

TABLE 3

| No. | Comparative Example | | | |
|---|---|---|---|---|
| | 11 | 12 | 13 | 14 |
| Unsaturated Copolymer | | | | |
| Comonomer | | | | |
| Type | HD[3] | HD | — | Ethylene |
| Content (mol %) | 0.7 | 0.7 | — | 5 |
| Molecular Weight (Mw) | 23 × 10⁴ | 23 × 10⁴ | 25 × 10⁴ | 25 × 10⁴ |
| Graft Reaction Conditions | | | | |
| Radical Generator (phr) | 0.001 | 0.003 | 0.003 | 0.003 |
| Maleic Anhydride (phr) | 1.0 | 3.0 | 3.0 | 3.0 |
| Graft Copolymer | | | | |
| Molecular Weight (Mw) | 11 × 10⁴ | 10 × 10⁴ | 5 × 10⁴ | 6 × 10⁴ |
| Graft Content (weight %) | 1.0 | 2.9 | 0.4 | 0.6 |

Note:
[3] 1,4-Hexadiene.

As is clear from the above results, in the production of graft copolymers by using the propylene random copolymers containing unconjugated diene comonomers, the reduction of the molecular weight can substantially be avoided while increasing the graft ratio when graft polymerization is conducted in the absence of the radical generator.

According to the method of the present invention, the reduction of molecular weight can substantially be avoided in the resulting modified polypropylenes (graft copolymers) as compared with conventional methods. And when compared on the same molecular weight, the method of the present invention provides an extremely higher graft ratio than the conventional methods.

Accordingly, the graft copolymers produced by the method of the present invention have high concentrations of functional groups introduced by graft comonomers. Thus, they have drastically improved chemical properties such as adhesion, coatability, printability, hydrophilic properties, etc. In addition, unpleasant odors and coloring due to unreacted monomers can be drastically decreased. Further, since there is only small reduction of molecular weight, the graft copolymers produced by the method of the present invention have good moldability.

The modified polypropylenes obtained by the method of the present invention are suitable as additives for improving adhesion and coatability, compatibilizers for resin compositions for automobile parts, electric appliances, industrial parts, wrapping films, etc.

What is claimed is:

1. A method of producing a modified polypropylene having a weight-average molecular weight of 50,000-1,000,000 and a graft ratio of 0.1-10 weight %, said weight-average molecular weight and said graft ratio satisfying the following relation:

$$50,000 \leq (\text{weight-average molecular weight}) \times (\text{graft ratio expressed by weight \%}),$$

comprising the step of graft-polymerizing 100 parts by weight of a substantially crystalline propylene random copolymer having a weight-average molecular weight of 100,000-1,000,000 and consisting essentially of propylene and 0.05-10 mol % of an unconjugated diene comonomer represented by the general formula:

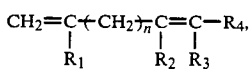

wherein $R_1$-$R_4$ are H or an alkyl group having 1-6 carbon atoms, and n is an integer of 1-20, with 0.1-10 parts by weight of a monomer having an unsaturated bond in the presence of a radical generator.

2. A method of producing a modified polypropylene comprising the step of graft-polymerizing a substantially crystalline propylene random copolymer consisting essentially of propylene and 0.05-10 mol % of an unconjugated diene comonomer represented by the general formula:

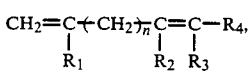

wherein $R_1$-$R_4$ are H or an alkyl group having 1-6 carbon atoms, and n is an integer of 1-20, excluding a case where $R_3$ or $R_4$ is a methyl group and all other substituents are H when n=1, with a monomer having an electron-attracting group and an unsaturated bond, by a melt-blending method at 180°-300° C., in the absence of a radical generator.

3. The method according to claim 1, wherein said propylene random copolymer further contains 5 mol % or less of other unsaturated monomers.

4. The method according to claim 1, wherein said monomer is maleic anhydride, acrylic acid or glycidyl methacrylate.

5. The method according to claim 2, wherein said propylene random copolymer further contains 5 mol % or less of other unsaturated monomers.

6. The method according to claim 2, wherein said monomer is maleic anhydride, acrylonitrile or glycidyl methacrylate.

7. The method according to claim 2, wherein the graft polymerization of said propylene random copolymer with said monomer is carried out in the presence of a Lewis acid.

8. A method of producing a modified polypropylene comprising the step of graft-polymerizing a substantially crystalline propylene random copolymer consisting essentially of propylene and 0.05-10 mol % of an unconjugated diene comonomer represented by the general formula:

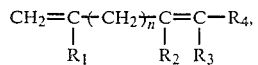

wherein $R_1$-$R_4$ are H or an alkyl group having 1-6 carbon atoms, and n is an integer of 1-20, excluding a case where $R_3$ or $R_4$ is a methyl group and all other substituents are H when n=1, with a monomer having an electron-attracting group and an unsaturated bond, by a solution method at 90°-200° C., in the absence of a radical generator.

9. The method according to claim 8, wherein said propylene random copolymer further contains 5 mol % or less of other unsaturated monomers.

10. The method according to claim 8, wherein said monomer is maleic anhydride, acrylonitrile or glycidyl methacrylate.

11. The method according to claim 8, wherein the graft polymerization of said propylene random copolymer with said monomer is carried out in the presence of a Lewis acid.

* * * * *